United States Patent [19]

Hung et al.

[11] Patent Number: 5,343,525
[45] Date of Patent: Aug. 30, 1994

[54] HARD DISK DATA SECURITY DEVICE

[75] Inventors: Chan-Chi Hung, Hsinchu; Sheng-Yuan Lee, Chupei; Yao-Jung Kuo, Hsinchu, all of Taiwan

[73] Assignee: Value Technology Inc., Hsin-Chu, Taiwan

[21] Appl. No.: 924,950

[22] Filed: Aug. 5, 1992

[51] Int. Cl.[5] .............................................. H04L 9/00
[52] U.S. Cl. ..................................... 380/4; 380/9; 380/23; 380/25; 380/49; 380/50; 340/825.31; 340/825.34
[58] Field of Search ................ 380/4, 9, 23, 25, 49, 380/50, 52; 340/825.31, 825.34

[56] References Cited

U.S. PATENT DOCUMENTS 4,757,534  7/1988  Matyas et al. .................... 380/25
4,797,928  1/1989  Dykes ............................. 380/49

Primary Examiner—Bernarr E. Gregory
Attorney, Agent, or Firm—Ezra Sutton

[57] ABSTRACT

A hard disk data security device comprises a control circuit which once detecting an I/O address of data register for hard disk present on the address bus enables a data enciphering/deciphering circuit which receives the data to be stored on the hard disk from the computer inside which the hard disk is installed and converts the data from a regular form into an encrypted form or receives the encrypted data from the hard disk and decrypts and outputs the data to the computer. A plurality of switches may be provided for a user to select an arbitrary encrypting pattern of the data byte.

7 Claims, 1 Drawing Sheet

HARD DISK DATA SECURITY DEVICE

FIELD OF THE INVENTION

The present invention relates generally to a data security device and in particular to a data security device for a hard disk (also referred to as a fixed disk) by encrypting the data to be stored in the hard disk in a special manner to provide data security.

BACKGROUND OF THE INVENTION

Data security devices are currently commercially available. These devices use either software or hardware to convert the data to be stored in a hard disk drive in such a manner that only the specific decrypting means of such devices can read the encrypted data. Heretofore, the decrypting means of data security device for both the software type and hardware type encrypting means are in the form of software which takes CPU (central processing unit) time and memory in execution. This worsens the efficiency of the CPU.

It is therefore desirable to have a data security device in the form of hardware so as to provide a desired data security while maintaining the CPU efficiency and the availability of the computer memory and the CPU to the users.

OBJECTS OF THE INVENTION

The primary object of the present invention is therefore to provide a data security device for a hard disk which is in a form of hardware so as to provide a desired data security for the data stored in a fixed disk driver while maintaining the CPU efficiency and the availability of the computer memory and the CPU to the users of a computer.

It is another object of the present invention to provide a hard disk data security device which is capable to detect the hard disk I/O address on an address bus to automatically actuate encrypting of the data to be stored in the hard disk so as to convert the data into a security mode which is only readable to a decrypting means associated therewith so as to provide data security.

To achieve the above-mentioned object, there is provided a hard disk data security device comprising a control circuit which once detecting an I/O address of data register for hard disk present on the address bus enables a data enciphering/deciphering circuit which receives the data to be stored on the hard disk from the computer inside which the hard disk is installed and converts the data from a regular form into an encrypted form or receives the encrypted data from the hard disk and decrypts and outputs the data to the computer. A plurality of switches may be provided for a user to select an arbitrary encrypting pattern of the data byte.

Other objects and advantages of the invention will be apparent from the following description of a preferred embodiment taken in connection with the only one drawing which is:

DETAILED DESCRIPTION OF THE PREFERRED EMBODIMENT

Figure 1:
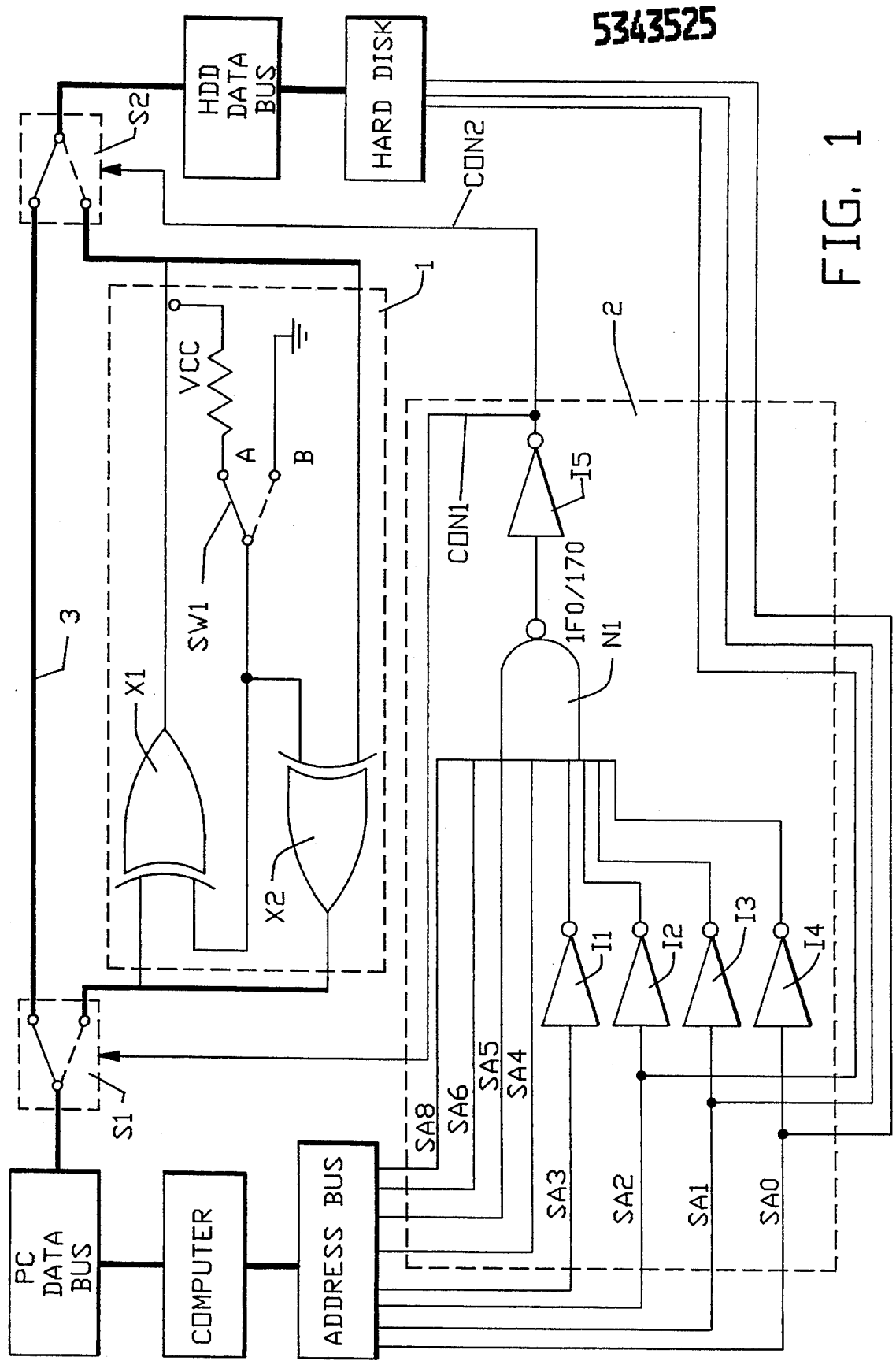
FIG. 1 is a circuit diagram showing the circuit comprised in the hard disk data security device in accordance with the present invention.

Referring to the drawing, a hard disk data security device in accordance with the present invention comprises a data enciphering/deciphering circuit 1 and a control circuit 2. The control circuit 2 is used to check if an I/O address of data register for hard disk, preferably the hexadecimal signal 1F0/170 which normally represents an I/O address for the hard disk of a personal computer, preferably an IBM compatible personal computer (IBM is a trademark of International Business Machine Co.), is present on an address bus of the computer (not explicitly shown) on which the data security device is installed. In the embodiment shown in the drawing, symbols SA0–SA6 and SA8 respectively represent a portion of signal lines of a standard (IBM compatible) personal computer address bus of which lines SA0–SA3 are respectively connected to an input of a NAND gate N1 via an invertor I1, I2, I3 or I4 while lines SA4–SA6 and SA8 are respectively connected to an input of the NAND gate N1 directly. The output of the NAND gate N1 is sent out to two control lines CON1 and CON2 via a further invertor I5.

With such an arrangement, once the hexadecimal signal 1F0/170 is present on the address bus, the control lines CON1 and CON2 will actuate electronic switches S1 and S2 to form a data flow path through the data enciphering/deciphering circuits 1.

The data enciphering/deciphering circuits 1 comprises at least a sub-circuit each of which is associated with a bit of a data byte on the data bus and thus if the computer on which the data security device is installed is a sixteen bit machine, there are correspondingly sixteen sub-circuits included in the data enciphering/deciphering circuits 1. For simplifying the illustration, there is only one such sub-circuit of the data enciphering/deciphering circuit 1 shown in the drawing. However, it is understood that there can be more than one such sub-circuit to be respectively associated with each bit of an actual data byte.

The sub-circuit of the data enciphering/deciphering circuit 1 comprises two exclusive OR gates X1 and X2 each of which has two inputs one of which is connected to a data bit line and the other to a voltage source VCC so that the exclusive OR gates X1 and X2 can invert a bit of a data byte, namely converting the bit into the binary complemental number thereof. These two exclusive OR gates X1 and X2 are arranged in different directions of data flow and thus respectively for writing to and reading from the hard disk.

A switch SW1 is included in the sub-circuit of the data enciphering/deciphering circuit 1 in such a manner to make the inputs of the exclusive OR gates X1 and X2 which are connected the voltage source VCC now selectively switchable between the voltage source VCC (which may be a HIGH state) or ground (which may represent a LOW state). By selecting the ground, the exclusive OR gates X1 and X2 no longer convert a data bit into its binary complemental number.

In accordance with the present invention, the switch SW1 for each sub-circuit of the data enciphering/deciphering circuit 1 can be set or re-set individually so as to provide a variety of different combinations of setting and re-setting of the switches associated with the bits of a data byte.

With the arrangement described above, it is understood that once the control circuit 1 detects the hexadecimal signal 1F0/170 present on the address bus, the connection between the computer data bus (designated as PC DATA BUS in the drawing) and the hard disk data bus (designated as HDD DATA BUS in the drawing) is done via the data enciphering/deciphering circuit 1 and once the switch SW1 is selected to connect to the voltage source VCC, each bit of a data byte flowing on the computer data bus will be inverted. The inverted data which is thereafter stored on the hard disk can only be read by using the data enciphering/deciphering circuit 1 which once again inverted the data byte to restore to the original data form.

If no 1F0/170 signal is present on the address bus, the data bus of the computer is connected directed to the hard disk via a data bus 3.

It is understood that although in the embodiment shown in the drawing, the encrypting is done by inverting a bit of a data byte into its binary complemental form, it is also possible to provide another way to encrypt the data byte provided that such a method meets the requirements of the present invention.

The switch SW1 used to select the encrypting path or the non-encrypting path for a data bit can be set manually or by an electronic control so that if there is more than one such switch, each of the switches can be operated individually and in such a case, arbitrarily setting these switches provides an arbitrary combination of the setting or re-setting of the switches and thus making it difficult for an unauthorized person to decipher the data codes stored in the hard disk.

It is apparent that although the invention has been described in connection with a preferred embodiment, those skilled in the art may make changes to certain features of the preferred embodiment without departing from the spirit and scope of the invention as defined in the appended claims.

What is claimed is:

1. A hard disk data security device for a computer wherein said computer comprises a computer address bus, a computer data bus and a hard disk with a hard disk data bus connected between said computer data bus and said hard disk, said security device comprising a control circuit and a data enciphering/deciphering circuit actuated by said control circuit when detecting an I/O address of data register for the hard disk present on the address bus, said data enciphering/deciphering circuit receiving a first data byte from said computer data bus and generating a second data byte or receiving the second data byte and converting the second data byte into the first data byte.

2. A hard disk data security device as claimed in claim 1 wherein said I/O address is hexadecimal 1F0/170 and wherein said control circuit comprises a plurality of inputs respectively connected to a signal line of the address bus so that when the hexadecimal 1F0/170 signal is present on the address bus, a control signal is generated by the control circuit to actuate the data enciphering/deciphering circuit.

3. A hard disk data security device as claimed in claim 1 wherein said control signal generated by said control circuit is used to control a plurality of first switches which selectively connects said computer data bus to said hard disk via said data enciphering/deciphering circuit under the control of said first switches.

4. A hard disk data security device as claimed in claim 1 wherein said data enciphering/deciphering circuit comprises at least a sub-circuit which is associated with a bit of the data byte, said sub-circuit comprising a first exclusive OR gate which has a first input connected to a voltage source and a second input to receive the first data bit and converting said first data bit into the second data bit, said sub-circuit of the data enciphering/deciphering circuit further comprising a second exclusive OR gate which has a first input connected to a voltage source and a second input to receive the second data bit to convert said second data bit into said first data bit.

5. A hard disk data security device as claimed in claim 4 wherein said sub-circuit comprises a second switch which is switchable between a set position wherein a bit of the data byte is conducted to pass through and is thus converted by said sub-circuit and a reset position wherein said bit of the data byte is not conducted through said sub-circuit and thus not converted thereby, each of said second switches being capable to be set or reset independently of each other so as to provide a variety of different combinations of setting and resetting of the second switches associated with the bits of the data byte.

6. A hard disk data security device as claimed in claim 1 wherein said data enciphering/deciphering circuit comprises at least a sub-circuit which is associated with a bit of the data byte, said sub-circuit comprising a first exclusive OR gate which has a first input connected to a voltage source and a second input to receive the first data bit and converting said first data bit into the second data bit, said sub-circuit of the data enciphering/deciphering circuit further comprising a second exclusive OR gate which has a first input connected to a voltage source and a second input to receive the second data bit to convert said second data bit into said first data bit, the sub-circuit comprising a second switch which is switchable between a set position wherein said data bit is conducted to pass through and is thus converted by said sub-circuit and a reset position wherein said data bit is not conducted through said sub-circuit and thus not converted thereby, each of said second switches being capable to be set or reset independently of each other so as to provide a variety of different combinations of setting and resetting of the second switches associated with the bits of the data byte, said second switch being disposed in said data enciphering/deciphering circuit in such a way to selectively connect said first inputs of said first and second exclusive OR gates to said voltage source to set said second switch to the set position or to connect said first inputs of said first and second exclusive OR gates to ground to set said second switch to the re-set position.

7. A hard disk data security device as claimed in claim 1 wherein said I/O address is hexadecimal 1F0/170 and wherein said control circuit comprises a plurality of inputs respectively connected to a signal line of the address bus so that when said hexadecimal 1F0/170 signal is present on the address bus, a control signal is generated by the control circuit to control a plurality of first switches which selectively connects said computer data bus to said hard disk via said data enciphering/deciphering circuit under the control of said first switches and wherein said data enciphering/deciphering circuit comprises at least a sub-circuit which is associated with a bit of the data byte, said sub-circuit comprising a first exclusive OR gate which has a first input connected to a voltage source and a second input to receive the first data bit and converting said first data bit into the second data bit, said data enciphering/deciphering circuit further comprising a second exclusive OR gate which has a first input connected to a voltage source and a second input to receive the second data bit to convert said second data bit into said first data bit, the sub-circuit comprising a second switch which is switchable between a set position wherein said data bit is conducted to pass through and is thus converted by said sub-circuit and a reset position wherein said data bit is not conducted through said sub-circuit and thus not converted thereby, each of said second switches being capable to be set or reset independently of each other so as to provide a variety of different combinations of setting and re-setting of the second switches associated with the bits of the data byte, said second switch being disposed in said data enciphering/deciphering circuit in such a way to selectively connect said first inputs of said first and second exclusive OR gates to said voltage source to set said second switch to the set position or to connect said first inputs of said first and second exclusive OR gates to ground to set said second switch to the re-set position.

* * * * *